US008612500B2

(12) United States Patent
Haller et al.

(10) Patent No.: US 8,612,500 B2
(45) Date of Patent: Dec. 17, 2013

(54) METHOD AND DECIMAL ARITHMETIC LOGIC UNIT STRUCTURE TO GENERATE A MAGNITUDE RESULT OF A MATHEMATIC

(75) Inventors: Wilhelm Haller, Remsbalden (DE); Ulrich Krauch, Dettenhausen (DE); Guenter Mayer, Schoensich (DE); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1473 days.

(21) Appl. No.: 12/013,905

(22) Filed: Jan. 14, 2008

(65) Prior Publication Data

US 2008/0177816 A1     Jul. 24, 2008

(30) Foreign Application Priority Data

Jan. 18, 2007   (EP) ..................................... 07100731

(51) Int. Cl.
*G06F 15/00*     (2006.01)
*G06F 7/50*     (2006.01)

(52) U.S. Cl.
USPC .......................................... 708/201; 708/680

(58) Field of Classification Search
USPC ......... 708/201, 280, 282, 283, 285, 680, 682, 708/683, 685
See application file for complete search history.

(56) References Cited

U.S. PATENT DOCUMENTS

| 3,937,941 A | * | 2/1976 | Zemel et al. .................. 708/674 |
| 4,001,570 A | * | 1/1977 | Gooding et al. .............. 708/673 |
| 5,944,772 A | * | 8/1999 | Haas et al. .................... 708/233 |
| 6,292,819 B1 | | 9/2001 | Bultmann et al. |
| 2006/0031279 A1 | * | 2/2006 | Haller et al. .................. 708/670 |

OTHER PUBLICATIONS

Eric M Schwarz, "Binary Floating-Point Unit Design: The fused multiply-add dataflow", Chapter 9, High Performance Energy Efficient Microprocessor Design, ISBN 0-387-28594-6, Springer, Jul. 2006, pp. 189-208.

\* cited by examiner

*Primary Examiner* — Chuong D Ngo
(74) *Attorney, Agent, or Firm* — Steven Chiu

(57) ABSTRACT

A method to generate a magnitude result of a mathematic operation of two decimal operands within one cycle in a decimal arithmetic logic unit structure, wherein the decimal operands are in hexadecimal sign magnitude format.

14 Claims, 3 Drawing Sheets

METHOD AND DECIMAL ARITHMETIC LOGIC UNIT STRUCTURE TO GENERATE A MAGNITUDE RESULT OF A MATHEMATIC

BACKGROUND OF THE INVENTION

The invention relates to a method to generate a magnitude result of a mathematic operation of two decimal operands within one cycle in a decimal arithmetic logic unit structure, particularly wherein the decimal operands are in hexadecimal sign magnitude format, plus a decimal arithmetic logic unit structure to perform such a method.

Mainframe computers can increase the speed of decimal operations. For example, two operands X, Y to be added with or to be subtracted from each other are in a sign magnitude hexadecimal format. In sign magnitude hexadecimal format each digit i of the operands X, Y and of the result of the mathematic operation is represented by a four-bit code with the values '0' to '9' encoded as '0000' to '1001'. The hexadecimals 'A', 'C', 'E', 'F' indicate a positive algebraic sign, wherein 'B' and 'D' indicate a negative sign. Before an arithmetical operation takes place, the signs are removed from the operands, and it is decided whether an effective decimal addition or an effective decimal subtraction is being performed.

In case of an effective subtraction, the magnitude of the result can be less than zero, if the minuend X is smaller than the subtrahend Y. In this case, an additional cycle is necessary to re-complement the result into a sign magnitude format, as known in the art.

The general rule for binary decimal operations like additions (ADD) and subtractions (SUB) of two operands X, Y is as follows:

ADD: $S = X + Y + 6_{digitwise}$

Thereby, if the digit carry-out (DCyOuti) of a digit i of the result S is zero, i.e. DCyOuti=0, then the digit i has to be corrected by subtracting six. Otherwise, the digit i is correct.

SUB: $S = A - B$

Thereby, if DCyOuti=0, then the digit i is corrected by subtracting 6. Otherwise, digit i is correct. Further, if the carry-out (CyOut) of the most significant digit (MSD) on the left is zero, i.e. DCyOutMSD=CyOut=0, the result S is negative and must be re-complemented to get the magnitude M.

The procedure of a subtraction with negative result S is explained with reference to the following example.

Two decimal operands X=2856 and Y=5947 are subtracted from each other. The decimal result S has the magnitude M 3091 and is negative.

The digits 2856 of the operand X in hexadecimal are represented by the four-bit codes a, b, c, d

|    | d    | c    | B    | a    |
|----|------|------|------|------|
| X: | 0010 | 1000 | 0101 | 0110 | with the digit 'a' as the least significant digit (LSD) and the digit 'd' as the most significant digit (MSD).

The digits 5947 of the operand Y in hexadecimal are represented by the four-bit codes

|    | d    | c    | B    | a    |
|----|------|------|------|------|
| Y: | 0101 | 1001 | 0100 | 0111 |

To perform the subtraction, the two's complement of the inverted operand Y' is added with the first operand X. To do so, first the operand Y is inverted bitwise to

|     | d    | c    | B    | a    |
|-----|------|------|------|------|
| Y': | 1010 | 0110 | 1011 | 1000 |

To get the two's complement of the operand Y, further a carry-in (CyIn) of one, i.e. CyIn=1, is added to the least significant digit (LSD) 'a' on the right of Y'. Considering this, the subtraction X−Y is performed according to

|         |   | d    | c    | B    | a    |
|---------|---|------|------|------|------|
| X:      |   | 0010 | 1000 | 0101 | 0110 |
| + Y':   | + | 1010 | 0110 | 1011 | 1000 |
| + CyIn: | + |      |      |      | 1    | wherein the following DCyOuti are generated by the digitwise addition

|          | d | c | B | a |
|----------|---|---|---|---|
| DCyOuti: | 0 | 0 | 1 | 0 |

The DCyOuti of the digits i are used as digit carry-in (DCyIni+1) for the next higher digits i+1 to the left according to:

|              |   | d    | c    | B    | a    |
|--------------|---|------|------|------|------|
| X:           |   | 0010 | 1000 | 0101 | 0110 |
| + Y':        | + | 1010 | 0110 | 1011 | 1000 |
| + CyIn:      | + |      |      |      | 1    |
| + DCyIni + 1:| + | 0    | 0    | 1    | 0    |
|              | = | 1100 | 1111 | 0000 | 1111 |

Thereby, any DCyOuti=0 indicates a digitwise minus six correction for the particular digit according to

|             |   | d    | c    | B    | a    |
|-------------|---|------|------|------|------|
| X:          |   | 0010 | 1000 | 0101 | 0110 |
| + Y':       | + | 1010 | 0110 | 1011 | 1000 |
| + CyIn:     | + |      |      |      | 1    |
| DCyIni + 1: | + | 0    | 0    | 1    | 0    |
|             | = | 1100 | 1111 | 0000 | 1111 |
| DCyOuti:    |   | 0    | 0    | 1    | 0    |
| − 6:        | + | 1010 | 1010 |      | 1010 |
| iR:         | = | 0110 | 1001 | 0000 | 1001 |
| decimal:    |   | 6    | 9    | 0    | 9    | with the intermediate result iR. The result of the operation includes an intermediate result iR since the DCyOuti of the digit 'd' on the left that is the MSD is zero. The DCyOuti of the digit 'd' is the CyOut. CyOut=0 indicates a recomplementation of the result of the operation performed to obtain the magnitude M of the result S of the subtraction.

To do so, a second cycle is performed, wherein the first operand X is zero and the second operand Y is the intermediate result iR:

|  |  | d | c | B | a |
|---|---|---|---|---|---|
| 0000: |  | 0000 | 0000 | 0000 | 0000 |
| − 6909: | + | 1001 | 0110 | 1111 | 0110 |
| CyIn: | + |  |  |  | 1 |
|  | = | 1001 | 0110 | 1111 | 0111 |
| DCyOuti: |  | 0 | 0 | 0 | 0 |
| − 6: | + | 1010 | 1010 | 1010 | 1010 |
| M: | = | 0011 | 0000 | 1001 | 0001 |
| decimal: |  | 3 | 0 | 9 | 1 |

To perform such operations within a microprocessor, a decimal arithmetic logic unit structure (ALU) ALU1 as shown in FIG. 1 is used. FIG. 1 shows an embodiment of a carry select structure which known in the art. However, the sum can be achieved with any other adder structure which achieves the performance requirements.

Two decimal operands X, Y, minuend X and subtrahend Y, are provided by registers R1, R2. The register R1 is connected with a first input of a digit carry network DCN and with first inputs of two pre-sum logics P1, P2. The output of the register R2 is connected to the input of an inverter I and with an adder A1 in parallel to the inverter I. The inverter performs a bitwise inversion of the operand Y. The adder A1 performs a digitwise +6 addition of the operand Y that is needed for effective decimal additions.

The output of the inverter I is connected to a first input of a first multiplexer M1. The output of the adder A1 is connected to a second input of the first multiplexer M1. A signal EDA indicating an effective decimal addition is used to select the second input of the multiplexer M1 as an output. The orthogonal signal of EDA, indicating an effective decimal subtraction is used to select the first input of the multiplexer M1 as an output. The signal EDA is generated by an operation decoder (not shown). The signal EDA and its mutual exclusive signal EDS (effective decimal subtraction), can be generated by inverting the other. The output of the multiplexer M1 is connected to a second input of the digit carry network DCN and to the second inputs of the two pre-sum logics P1, P2.

The digit carry network DCN operates according to conventional carry look ahead techniques by using generate and propagate functions of the operand bits to generate the CyOut of the MSD. Furthermore, the digit carry network DCN generates DCyOuti, i.e. DCyIni+1, for each of the decimal digit positions. The digit carry network DCN further has a third input. The signal EDA is inverted and fed to said third input. The inverted signal EDA indicates CyIn=1 for the LSD which is needed to generate the two's complement of the subtrahend Y for performing subtractions.

The pre-sum logics P1, P2 have third inputs each, wherein the third input of the pre-sum logic P1 is fed with an input of '0' and the third input of the pre-sum logic P2 is fed with an input of '1'. Depending on the operand version received, the pre-sum logic P1 generates from the operands digitwise preliminary results X+Y+6 or X−Y on the assumption that DCyIni+1=0 and the pre-sum logic P2 generates from the operands digitwise preliminary results X+Y+6 or X−Y on the assumption that DCyIni+1=1.

The pre-sum selection is performed by a second multiplexer M2 which selects one of the pre sums X+Y+6 and X−Y digitwise, depending on DCyIni+1 provided by the digit carry network DCN into the digit position shown.

The structure of FIG. 1 is also known as Carry Select Adder Structure. It can be of any type, e.g. a Carry Propagation Structure CPA. As known in the art, only the digitwise +6 and −6 feature is required, but the carry network and the preliminary sum can be generated with any appropriate known structure.

The following describes a configuration having only the path of one digit. The complete width of the result is formed of several digits, e.g. 8 digits. The output of the second multiplexer M2 is split into two parallel paths. The first path is directly connected to a first input of a third multiplexer M3. The second path leads to a second adder A2 that performs a digitwise −6 correction. The result of that digitwise −6 correction is fed to a second input of the third multiplexer. Depending on the appropriate DigitCyOut of the digit carry network DCN, one of the two inputs of the third multiplexer M3 is selected as an output. If DigitCyOut=1, the second input is selected, i.e. no correction needed. If DigitCyOut=0, the first input is selected, i.e. the digit has to be corrected by subtracting 6. If the CyOut of the MSD is 1, the output of all digits of the third multiplexer M3 is the magnitude M of the complete result. If the CyOut of the MSD is 0, the output of the third multiplexer M3 is the intermediate result iR that has to be recomplemented in order to get the magnitude M of the result S. To recomplement the intermediate result iR a second cycle has to be performed within the same hardware structure, with X=0 and Y=iR.

FIG. 3 shows another conventional decimal arithmetic logic unit structure ALU2 which, compared to the decimal arithmetic logic unit structure of FIG. 1, is enhanced to additionally perform binary mathematic operations. Thereby the same reference numerals are used as in FIG. 1. The enhancement is achieved by a substitution of the inverter I in FIG. 1 by a XOR-gate XO. Furthermore logic within the Block CDDC in FIG. 3 controls the switching levels of the multiplexer M3. For binary operation always the second level of this multiplexer M3 is active. In case of an effective decimal addition the operand Y provided by the register R2 runs via the adder A1. In case of an effective subtraction, binary as well as decimal, the operand Y runs via the XOR-gate XO in order to be inverted. This is controlled by a general subtraction signal any_Sub AS. This signal any_Sub AS can also be used as CarryIn for the DCN in order to achieve the two's complement within the DCN. If a binary operation is performed, no correction occurs at the third multiplexer M3.

Improvements to the structure of FIG. 1 are known, for example, as described in U.S. Pat. No. 5,944,772 and US 2006/0031279 A1. However, such improvements are directed to the reduction of the path delay. All known structures require an additional cycle in case of negative results to obtain the magnitude.

SUMMARY OF THE INVENTION

The present invention provides a method and a decimal arithmetic logic unit structure that allows generating the result particularly of an effective decimal subtraction within only one cycle in a microprocessor.

In accordance with an embodiment of the present invention, a method is disclosed which includes a magnitude result of a mathematic operation of two decimal operands that are in hexadecimal sign magnitude format with each decimal digit of the operands represented by a code of four bits, is generated within one cycle in a decimal arithmetic logic unit structure.

The method includes preparing the two decimal operands for a desired mathematic operation; generating preliminary result digits by digitwise adding the digits of the prepared operands under the assumption of digit carry-ins of zero; generating preliminary result digits by digitwise adding the digits of the prepared operands under the assumption of digit carry-ins of one simultaneously; determining digit carry-outs according to end around carry principles simultaneously to said generation of said preliminary result digits, which digit carry-outs are digit carry-ins for the next higher digits respectively, wherein by determining said digit carry-outs an end around carry is generated simultaneously that is the digit carry-out of the most significant digit on the left that, according to the EAC principles, simultaneously is the carry-in of the least significant digit on the right; digitwise selecting preliminary result digits in order to generate an intermediate result, wherein those preliminary result digits are selected, whose digit carry-in assumptions of zero or one match the digit carry-ins determined according to said end around carry principles; selectively bitwise inverting said intermediate result consisting of said digitwise preliminary results selected in case of a subtraction, wherein said selectively bitwise inversion depends on said end around carry; selectively correcting digits of said selectively inverted intermediate result in order to get the magnitude result of the mathematic operation, wherein said selectively correction in case of a subtraction depends on the value of the end around carry and the value of the digit carry-out of the particular digit, and in case of an addition depends on the value of the digit carry-out of the particular digit.

The method according to an embodiment of the invention has various advantages compared to conventional techniques. For example, using the end around carry principles to determine the digit carry-outs required to select the intermediate result digits immediately provides an end around carry that particularly in case of a subtraction allows to decide within one cycle whether an inversion of the intermediate result has to be performed or not. As a result, applying the end around carry principles on decimal mathematic operations generates a magnitude result within one cycle. As explained, the unit can perform any decimal addition and any decimal subtraction with the correct result in one cycle.

According to a preferred embodiment of the method, preparing the two decimal operands for a desired mathematic operation is performed by remaining a first one of the two operands unchanged and by changing a second of the two operands. Further a selection of the changed operands is performed, depending on the desired mathematic operation. Thereby a second one of the two operands is changed by digitwise increasing the second operand by six for an addition and by bitwise inverting the second operand for a subtraction. The unchanged operand is forwarded independently of the desired mathematic operation, wherein the changed operand is selected depending on the desired mathematic operation. This can be easily realized by two parallel signal paths preparing the operands to be changed plus a multiplexer selecting one of the changed operands depending on the desired mathematic operation.

Preferably said selectively bitwise inversion of the intermediate result in case of a subtraction takes place if the end around carry has the value of zero. The sequence of first performing the bitwise inversion and then the conditional digit correction has advantages such as allowing the unit to also be used for any addition. The sequence of first performing a conditional correction of +6 and then the bitwise inversion would require additional logic, i.e. digitwise −6, for the conditional correction of the result of an addition or of a subtraction with positive result.

Preferably, selectively correction of the selectively inverted intermediate result in case of a subtraction takes place by subtracting a constant modulus of six from each digit whose digit carry-out is one in case of an end around carry of zero or from each digit whose digit carry-out is zero in case of an end around carry (EAC) of one. Positive or negative results can be handled with one dataflow by just modifying some control signals.

In case of an addition, selectively correction of the selectively inverted intermediate result preferably takes place by subtracting a constant modulus of six from each digit whose digit carry-out is zero.

A second aspect of the present invention is directed to a decimal arithmetic logic unit structure to generate a magnitude result of a mathematic operation of two decimal operands within one cycle. Thereby the decimal operands are in hexadecimal sign magnitude format with each decimal digit of the operands represented by a code of four bits.

The decimal arithmetic logic unit structure comprises means to prepare the two decimal operands for a desired mathematic operation; means to generate preliminary result digits by digitwise adding the digits of the prepared operands under the assumption of digit carry-ins of zero; means to generate preliminary result digits by digitwise adding the digits of the prepared operands under the assumption of digit carry-ins of one simultaneously; means to determine digit carry-outs according to end around carry principles simultaneously to said generation of said preliminary result digits, which digit carry-outs are digit carry-ins for the next higher digits respectively, wherein by determining said digit carry-outs an end around carry is generated simultaneously that is the digit carry-out of the most significant digit on the left that, according to the end around carry principles, simultaneously is the carry-in of the least significant digit on the right; means to digitwise select preliminary result digits in order to generate an intermediate result, wherein those preliminary result digits are selected, whose digit carry-in assumptions of zero or one match the digit carry-ins determined according to said end around carry principles; means to selectively bitwise invert said intermediate result consisting of said digitwise preliminary results selected in case of a subtraction, wherein said selectively bitwise inversion depends on said end around carry; and means to selectively correct digits of said selectively inverted intermediate result in order to get the magnitude result of the mathematic operation, wherein said selectively correction in case of a subtraction depends on the value of the end around carry and the value of the digit carry-out of the particular digit, and in case of an addition depends on the value of the digit carry-out of the particular digit.

An advantage of the decimal arithmetic logic unit structure according to an embodiment of the present invention compared to conventional techniques involves using the end around carry principles to determine the digit carry-outs, required to select the intermediate result digits, immediately provides the end around carry that particularly in case of a subtraction allows to decide within one cycle whether an inversion of the intermediate result has to be performed or not. The EAC carry-out can also be used for indication, that the result is negative, e.g. to decide which sign has to be assigned to the magnitude result.

According to a decimal arithmetic logic unit structure according to an embodiment of the present invention, the means to prepare the two decimal operands for a desired mathematic operation comprise means to digitwise increase one of the two operands by six for an addition, means to bitwise invert one of the two decimal operands for a subtraction, means to select the prepared operands depending on the desired mathematic operation, plus means to forward one of the two operands unchanged. Those means preferably are arranged in a way that they can be used for different operations, i.e. they are arranged in a way that there are not only operation specific paths that are selected by the instructions or operations to be performed.

According to another preferred embodiment of the decimal arithmetic logic unit, the means to select the prepared operands depending on the desired mathematic operation comprise a multiplexer controlled by a signal indicating an effective decimal addition or an effective decimal subtraction, the multiplexer having two inputs, wherein a first input is connected with the means to digitwise increase one of the two operands by six for an addition and a second input is connected with the means to bitwise invert one of the two decimal operands for a subtraction.

According to an additional preferred embodiment of the decimal arithmetic logic unit structure, the means to generate preliminary result digits by digitwise adding the digits of the prepared operands under the assumption of digit carry-ins of zero and the means to generate preliminary result digits by digitwise adding the digits of the prepared operands under the assumption of digit carry-ins of one comprise pre sum logics having three inputs each, a first and a second one connected with the means to prepare the two operands respectively and a third one fed with a constant input signal of zero and one respectively, said input signals representing said carry-in assumptions. Such a so-called carry-select structure is faster than a so-called carry-propagation structure.

According to a preferred embodiment of the decimal arithmetic logic unit structure, the means to determine digit carry-outs according to end around carry principles comprise a digit end around carry network arranged in parallel to the means to generate preliminary result digits by digitwise adding the digits of the prepared operands under the assumption of digit carry-ins of zero and the means to generate preliminary result digits by digitwise adding the digits of the prepared operands under the assumption of digit carry-ins of one.

According to another preferred embodiment of the decimal arithmetic logic unit, the means to digitwise select preliminary result digits to generate an intermediate result comprise a multiplexer with pairs of inputs digitwise fed by said preliminary result digits determined under the two assumptions of a digit carry-in of zero and one, wherein said multiplexer is controlled by the digit carry-outs determined by the end around carry network.

According to another preferred embodiment of the decimal arithmetic logic unit, the means to selectively bitwise invert said intermediate result in case of a subtraction comprise an XOR-stage which bitwise inverts the intermediate result in case of an end around carry of zero. In order to use an EAC of zero to control the XOR-stage, preferably an inversion is applied to control the XOR stage in a way that it performs an inversion of the data from mux M2. The composed control signal is referenced as EAC_XCtl.

According to an additional preferred embodiment of the decimal arithmetic logic unit structure, the means to selectively correct digits of said selectively inverted intermediate result in case of a subtraction comprise means to subtract a constant modulus of six from each digit whose digit carry-out is one in case of an end around carry of zero or from each digit whose digit carry-out is zero in case of an end around carry of one.

According to a preferred embodiment of the decimal arithmetic logic unit structure, the means to selectively correct digits of said selectively inverted intermediate result in case of an addition comprise means to subtract a constant modulus of six from each digit whose digit carry-out is zero.

BRIEF DESCRIPTION OF THE DRAWINGS

The foregoing, together with other objects, features, and advantages of this invention can be better appreciated with reference to the following specification, claims and drawings, with:

DETAILED DESCRIPTION

Figure 1:
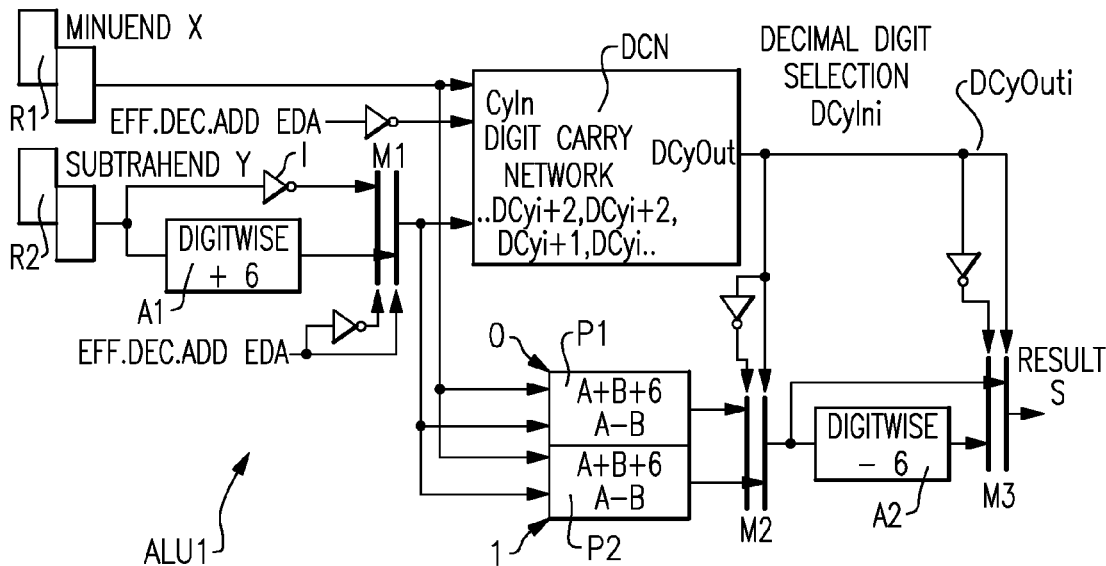
FIG. 1 showing a conventional schematic diagram of a decimal arithmetic logic unit structure, FIG. 2 showing a schematic diagram of a decimal arithmetic logic unit structure according to an embodiment of the invention performing a one cycle magnitude result, FIG. 3 showing a schematic diagram of the decimal arithmetic logic unit structure of FIG. 1 that is enhanced to additionally perform binary mathematic operations, FIG. 4 showing a schematic diagram of the decimal arithmetic logic unit structure of FIG. 2 that is enhanced to additionally perform binary mathematic operations, and FIG. 5 showing a schematic diagram of a simplified decimal arithmetic logic unit structure according to an embodiment of the present invention, wherein the pre-sums are generated within the EAC-network.

In the following, to illustrate, a method according to an embodiment of the present invention is described with reference to a subtraction of two decimal operands X=2856 and Y=5947.

The digits 2856 of the operand X in hexadecimal are represented by the four-bit codes a, b, c, d:

|    | d    | c    | B    | a    |
|----|------|------|------|------|
| X: | 0010 | 1000 | 0101 | 0110 | with the digit 'a' as the least significant digit (LSD) and the digit 'd' as the most significant digit (MSD).

The digits 5947 of the operand Y in hexadecimal are represented by the four-bit codes:

|    | d    | c    | B    | a    |
|----|------|------|------|------|
| Y: | 0101 | 1001 | 0100 | 0111 | with the digit 'a' as the LSD and the digit 'd' as the MSD.

In order to perform the subtraction, the operand Y is prepared by inverting it according to:

|     | d    | c    | B    | a    |
|-----|------|------|------|------|
| Y': | 1010 | 0110 | 1011 | 1000 | with Y' being the inverted operand.

Digitwise adding the operand X and the inverted operand Y' delivers the following intermediate Result iR:

|              |   | d    | c    | B    | a    |
|--------------|---|------|------|------|------|
| X:           |   | 0010 | 1000 | 0101 | 0110 |
| + Y':        | + | 1010 | 0110 | 1011 | 1000 |
| DCyOuti:     |   | 0    | 0    | 1    | 0    |
| + DCyIni + 1:| + | 0    | 1    | 0    | 0    |
| iR:          | = | 1100 | 1111 | 0000 | 1110 | with the digit carry-outs DCyOuti that are the digit carry-ins (DCyIni+1) for the next higher digits to the left.

Thereby the DCyOuti indicates how to handle the intermediate Result iR in the following manner. The DCyOuti of the MSD 'd' on the left side that is at the same time an end around carry (EAC) that is fed as DCyIni+1 on the LSD 'a' on the right indicates first to recomplement, i.e. invert the intermediate result iR according to:

|              |   | d    | C    | B    | a    |
|--------------|---|------|------|------|------|
| X:           |   | 0010 | 1000 | 0101 | 0110 |
| + Y':        | + | 1010 | 0110 | 1011 | 1000 |
| DCyOuti:     |   | 0    | 0    | 1    | 0    |
| + DCyIni + 1:| + | 0    | 1    | 0    | 0    |
| iR:          | = | 1100 | 1111 | 0000 | 1110 |
| recomplement:|   | 0011 | 0000 | 1111 | 0001 |

Further each DCyOuti=1 indicates to correct the particular digit by subtracting six according to:

|              |   | d    | c    | B    | a    |
|--------------|---|------|------|------|------|
| X:           |   | 0010 | 1000 | 0101 | 0110 |
| + Y':        | + | 1010 | 0110 | 1011 | 1000 |
| DCyOuti:     |   | 0    | 0    | 1    | 0    |
| + DCyIni + 1:| + | 0    | 1    | 0    | 0    |
| iR:          | = | 1100 | 1111 | 0000 | 1110 |
| recomplement:|   | 0011 | 0000 | 1111 | 0001 |
| −6:          | + |      |      | 1010 |      |
| MR:          | = | 0011 | 0000 | 1001 | 0001 |
| decimal:     | = | 3    | 0    | 9    | 1    |

As it can be seen, the method according to an embodiment of the present invention allows generating the magnitude result MR of a subtraction within one cycle by using the end around carry principles.

Figure 2:
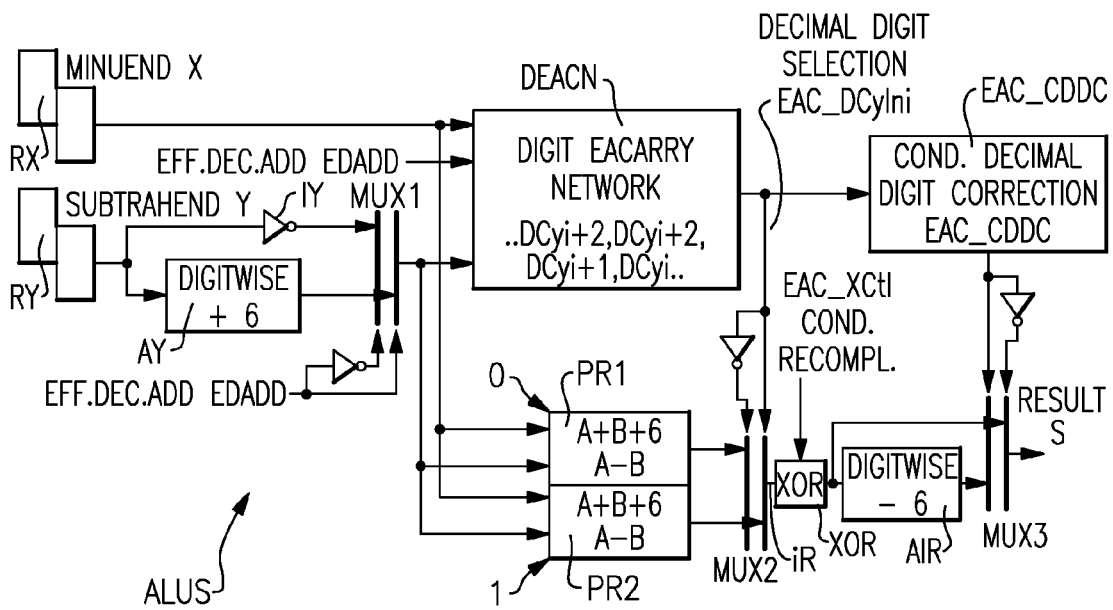
Figure 3:
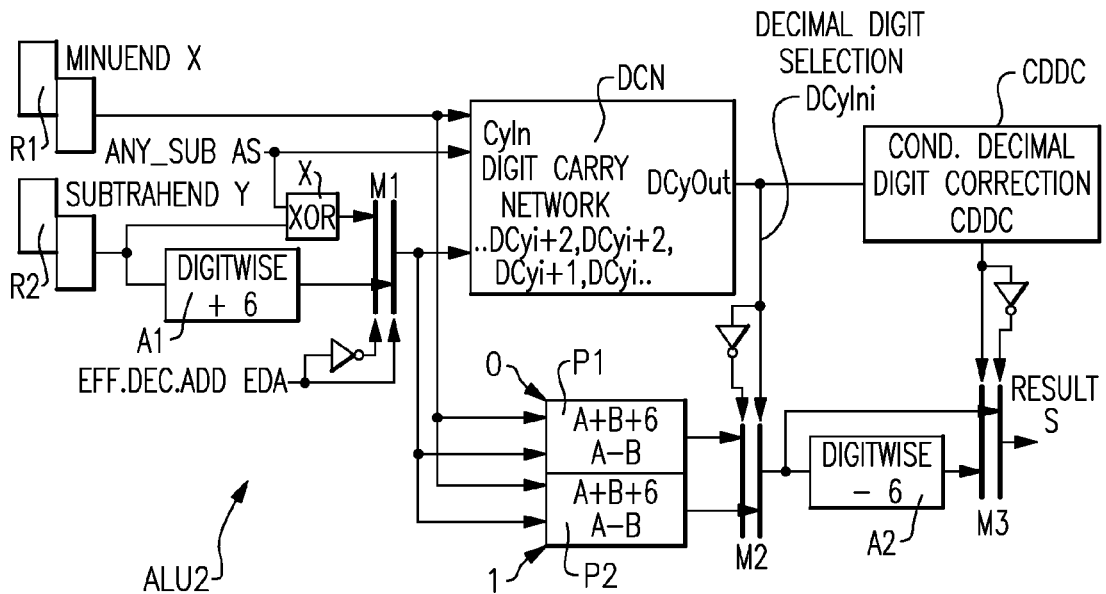

To realize the method according to an embodiment of the present invention, a decimal arithmetic logic unit structure ALUS as shown in FIG. 2 is contemplated.

The decimal arithmetic logic unit structure ALUS to generate a magnitude result of a mathematic operation of two decimal operands X, Y within one cycle comprises:

means IY, AY, MUX1 to prepare the two decimal operands for a desired mathematic operation, means PR1 to generate preliminary result digits by digitwise adding the digits of the prepared operands under the assumption of digit carry-ins of zero and means PR2 to generate preliminary result digits by digitwise adding the digits of the prepared operands under the assumption of digit carry-ins of one simultaneously, means DEACN to determine digit carry-outs according to end around carry principles simultaneously to said generation of said preliminary result digits, which digit carry-outs are digit carry-ins for the next higher digits respectively, wherein by determining said digit carry-outs an end around carry is generated simultaneously that is the digit carry-out of the most significant digit on the left that, according to the end around carry principles, simultaneously is the carry-in of the least significant digit on the right, means MUX2 to digitwise select preliminary result digits in order to generate an intermediate result, wherein those preliminary result digits are selected, whose digit carry-in assumptions of zero or one match the digit carry-ins determined according to said end around carry principles, means XOR to selectively bitwise invert said intermediate result consisting of said digitwise preliminary results selected in case of a subtraction, wherein said selectively bitwise inversion depends on said end around carry, and means AiR, MUX3 to selectively correct digits of said selectively inverted intermediate result in order to get the magnitude result of the mathematic operation, wherein said selectively correction in case of a subtraction depends on the value of the end around carry and the value of the digit carry-out of the particular digit, and in case of an addition depends on the value of the digit carry-out of the particular digit.

Two decimal operands X, Y, minuend X and subtrahend Y are provided by registers RX, RY. The register RX is connected with a first input of a digit end around carry network DEACN and with first inputs of two pre-sum logics PR1, PR2. The register RY is connected with an inverter IY and with an adder AY in parallel to the inverter IY. The inverter IY performs a bitwise inversion of the operand Y to the inverted operand Y', needed for an effective decimal subtraction. The adder AY performs a digitwise +6 addition of the operand Y that is needed for effective decimal additions. Both, the inverter IY and the adder AY prepare the operand Y for a desired mathematic operation.

The inverter IY is connected with a first input of a first multiplexer MUX1. The adder AY is connected with a second input of the first multiplexer MUX1. The inverted signal EDADD indicating an effective decimal subtraction is used to select the first input of the multiplexer MUX1 as an output. A signal EDADD indicating an effective decimal addition is used to select the second input of the multiplexer MUX1 as an output. The signal EDADD is generated by an operation decoder not shown which supplies at a certain point of time the signal EDADD. The output of the multiplexer MUX1 is connected with a second input to the digit carry network DEACN and with second inputs of the two pre-sum logics PR1, PR2.

The inverter IY and the adder AY together with the multiplexer MUX1 form the means to prepare the two decimal operands for a desired mathematic operation.

The pre-sum logics PR1, PR2 have third inputs each, wherein the third input of the pre-sum logic PRi is fed with an input of '0' and the third input of the pre-sum logic PR2 is fed with an input of '1'. The pre-sum logic PR1 generates preliminary result digits by digitwise adding the digits of the prepared operands under the assumption of digit carry-ins (DCyIni+1) of zero. The pre-sum logic PR2 generates preliminary result digits by digitwise adding the digits of the prepared operands under the assumption of digit carry-ins (DCyIni+1) of one.

The pre-sum logic PRi forms the means to generate preliminary result digits by digitwise adding the digits of the prepared operands under the assumption of digit carry-ins (DCyIni+1) of zero and the pre-sum logic PR2 forms means to generate preliminary result digits by digitwise adding the digits of the prepared operands under the assumption of digit carry-ins DCyIni+1 of one.

The digit end around carry network DEACN operates according to the end around carry principles in order to determine digit carry-outs DCyOuti, which are digit carry-ins DCyIni+1 for the next higher digits respectively. By determining said digit carry-outs DCyOuti an end around carry EAC is generated simultaneously that is the digit carry-out DCyOuti of the MSD 'd' on the left that, according to the EAC principles, simultaneously is the carry-in DCyIni+1 of the LSD 'a' on the right.

The EAC is composed by using generate and propagate functions of the operand bits to generate the CyOut of the MSD. Furthermore the digit carry network DEACN generates DCyOuti, i.e., DCyIni+1, for each of the decimal digit positions. The digit carry network DEACN further has a third input. The signal EDADD is fed to said third input, in order to disable EAC and force the network to generate normal carries for an addition. Thereby the EAC feedback is interrupted in case of add operations.

The selection is performed by a multiplexer MUX2 that digitwise selects preliminary result digits in order to generate the intermediate result iR, wherein those preliminary result digits are selected, whose carry-in assumptions of zero or one match the digit carry-ins DCyIni+1 determined according to said end around carry principles.

The output of the multiplexer MUX2 is fed into an XOR stage which is controlled by the EAC. If EAC=0 a recomplementation, i.e., a bitwise inversion of the intermediate result iR has to be performed, wherein in case of EAC=1, the intermediate result iR has to remain unchanged. To do so, the EAC is provided to the XOR stage via an additional logic (EAC_X-Ctl), which changes EAC to the required control signal for the XOR stage.

After the XOR stage, two parallel paths are foreseen. A first path is directly connected with a first input of a multiplexer MUX3. The second path comprises an adder AiR performing a digitwise minus six correction to the selectively inverted intermediate result. The result of that digitwise minus six correction is fed to a second input of the multiplexer MUX3. Depending on EAC and DCyOuti of the digit end around carry network DEACN, the inputs of the multiplexer MUX3 are selected as an output. The logic 0 control Mux3 is specified in EAC_CDDC.

Thereby the selection is performed as follows:

In case of subtraction: If EAC=0 then the recomplementation of the intermediate result is needed, done at the XOR stage. In addition if EAC=0 and DCyOuti=1 or if EAC=1 and DCyOuti=0 then the particular digit i has to be corrected by subtracting 6. Else digit i is correct.

According to the invention, the general rule for binary decimal operations with magnitude result for addition is:

ADD: $MR=X+Y+\text{digitwise }(+6)$.

If DCyOuti=0, then digit i has to be corrected by subtracting 6, else digit i is correct.

According to an embodiment of the present invention, the general rule for binary decimal operations with magnitude result for subtraction is:

SUB: $MR=X-Y$

If EAC=0 then the one's complement of the intermediate result is needed, done at the XOR stage in FIG. 2. In addition if EAC=0 and DCyOuti=1 or if EAC=1 and DCyOuti=0 then the digit i has to be corrected by subtracting 6. Else digit i is correct.

With little change to the decimal arithmetic logic unit structure ALUS of FIG. 2, the ALUS can be extended to also perform binary mathematic operations.

Figure 4:
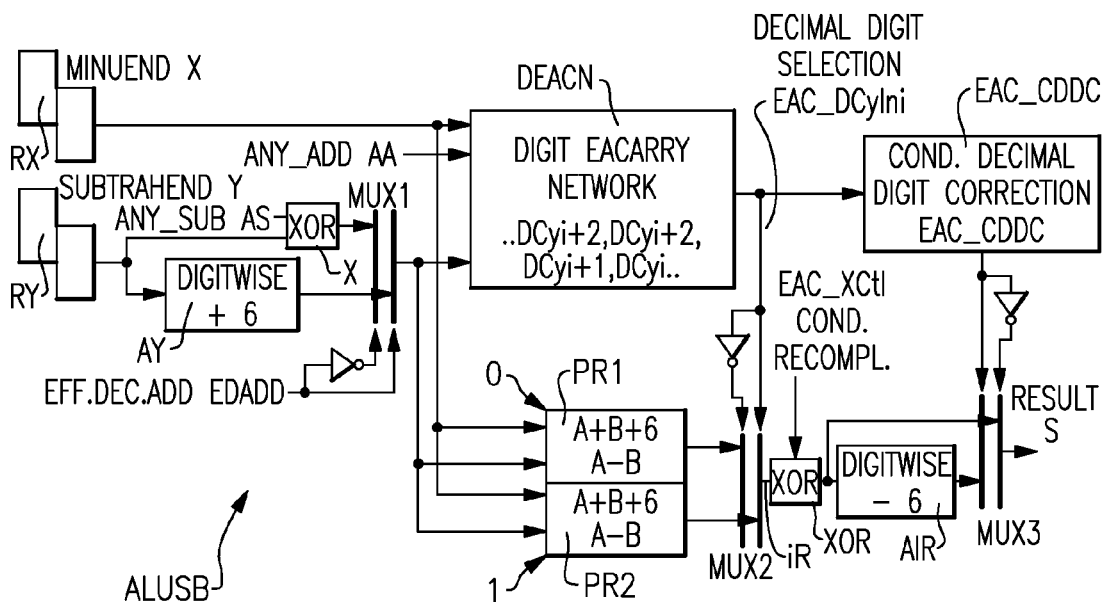

FIG. 4 shows such an extension that adds full binary addition/subtraction features to the decimal arithmetic logic unit structure according to the invention. In any case there is a gate, like e.g., the XOR-gate X1 in parallel to the +6 adder AY and the control signal need to be changed to take care of both decimal and binary operations. As shown in FIG. 4, the decimal arithmetic logic unit structure ALUS of FIG. 2, can be extended to also perform any binary add/sub operation without impact on performance. Accordingly, the inverter I of the decimal arithmetic logic unit structure ALUS shown in FIG. 2 is replaced by a XOR-gate X1 with the second input is a control signal in order to get the decimal arithmetic logic unit structure ALUSB shown in FIG. 4. With the extension for binary operation the EAC_CDDC functions selects only the second level of MUX3.

Figure 5:
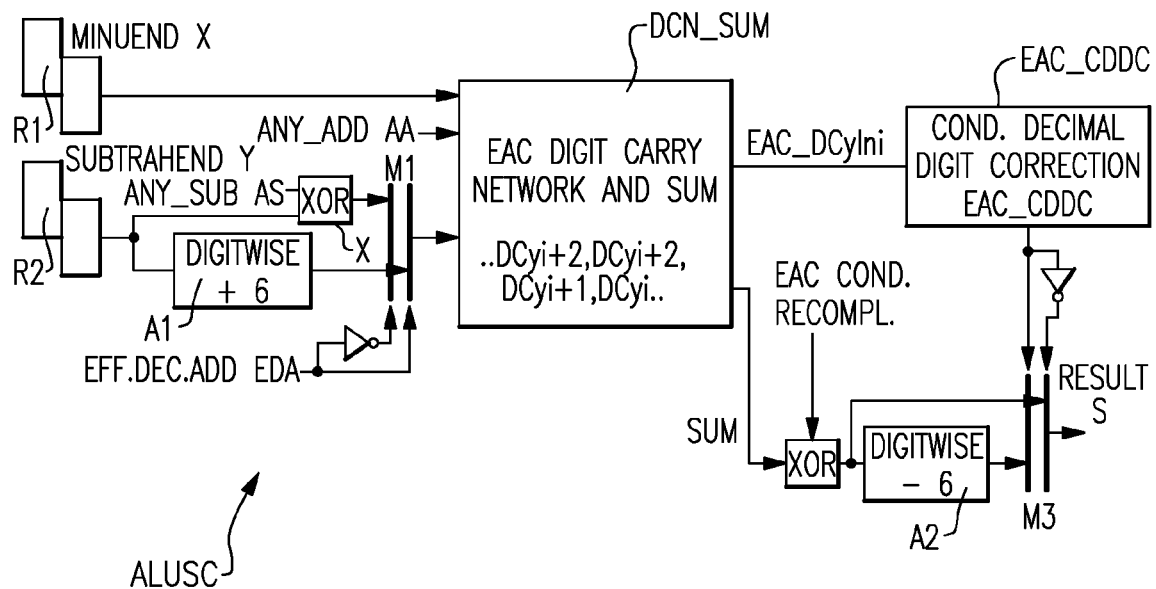

A simplified decimal arithmetic logic unit structure ALUSC is shown in FIG. 5. Thereby the pre-sums are no longer generated in the pre-sum logics PR1, PR2 and selected by the carry-outs generated by the digit end around carry network DEACN but they are generated and selected within the EAC-network DCN_SUM.

For effective decimal ADD, the EAC principle has to be turned of as stated out in Eric M. Schwarz, "Binary Floating-Point Unit Design: the fused multiply-add dataflow", Chapter 8, High Performance Energy Efficient Microprocessor Design (ISBN: 0-387-28594-6), Springer, Jul. 2006. One operand is then digitwise increased by 6. This is to jump over the boundary of the hexadecimal value F and to produce a carry-in to the next higher digit. If the digit carry-out of digit i (DCyOuti) is zero then the addends are in sum smaller than the hexadecimal value 9. In this case a constant value of 6 has to be subtracted from the appropriate digit (FIG. 2). For effective decimal SUB the digit end around carry network is active and two cases have to be considered:

1. The minuend is bigger than the subtrahend. The result of the subtraction is positive and EAC=1, wherein EAC is the carry-out of the MSD. A conditional digit correction has to take place if a DCyOuti=0. In this case the appropriate digit has to be reduced by six. Since EAC=1 the XOR stage does not change the result because EAC is fed to the XOR stage via additional logic.

2. The minuend is smaller than the subtrahend. The result of the subtraction is negative and EAC=0. In this case and according to the general EAC principle the result has to be bitwise inverted, i.e. the one's complement is needed. For the decimal subtraction an additional minus six correction is needed. The indication for the correction is DCyOut=1. If R' is the 1's complement of R and −6 indicates a conditional correction of a digit, then the following rule applies: $R'-6=(R+6)'$ So it is of advantage, to first take the one's complement and then perform a conditional minus six correction instead of the other way around. The minus six correction feature can then also be used for the effective decimal Add and for the effective decimal SUB with positive result. This saves hardware and shows the universal usage of the dataflow according to FIG. 2.

The formula EAC_XCtl for the XOR control is:

$EAC\_XCtl=(\text{Not}\_EAC*\textit{eff}\_dec\_\text{sub})$.

The formula for the second multiplexer Mux3 control, that controls the digitwise minus six correction is:

$$EAC\_CDDCi(1) = (\textit{eff\_dec}\_Add*Not\_DCyOuti) + (\textit{eff\_dec}\_Sub*DCyOuti*Not\_EAC) + (\textit{eff\_dec}\_Sub*Not\_DCyOuti*EAC)$$

With the extension for binary operation the EAC_CDDC functions selects only the second level of MUX3.

$$EAC\_CDDCi(2) = (\textit{eff\_dec}\_Add*Not\_DCyOuti*Not\_Binary) + (\textit{eff\_dec}\_Sub*DCyOuti*Not\_EAC*Not\_Binary) + (\textit{eff\_dec}\_Sub*Not\_DCyOuti*EAC*Not\_Binary)$$

Some embodiments of the invention have the advantage not having to have two sub-units in parallel, thereby reducing the amount of hardware gates required. Said decimal arithmetic logic unit structure according to the invention further has the advantage over the state of the art that an effective subtraction can be performed in one cycle. The principle can also be applied in newly arising hardware support for the decimal floating point number format. With minor modifications of the control signals the arithmetic logic unit structure can also perform universal binary operations.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. Method to generate a magnitude result of a mathematic operation of two decimal operands within one cycle in a decimal arithmetic logic unit structure, wherein the decimal arithmetic logic unit structure comprises an inverter, a first adder, a second adder, a first pre-sum logic, a second pre-sum logic, a first multiplexer, a second multiplexer, a third multiplexer, a digit end around carry network (DEACN), and an XOR gate, wherein the decimal operands are in hexadecimal sign magnitude format with each decimal digit of the operands represented by a code of four bits, said method comprising:

preparing, by the inverter, the first adder, and the first multiplexer, the two decimal operands for a mathematic operation;

generating, by the first pre-sum logic, preliminary result digits by digitwise adding the digits of the prepared operands, under an assumption that digit carry-ins is zero;

generating, by the second pre-sum logic, preliminary result digits by digitwise adding the digits of the prepared operands, under an assumption that digit carry-ins is one;

determining, by the DEACN, digit carry-outs, which digit carry-outs are digit carry-ins for the next higher digits respectively, wherein an end around carry is generated that is the digit carry-out of the most significant digit that simultaneously is the carry-in of the least significant digit;

digitwise selecting, by the second multiplexer, preliminary result digits to generate an intermediate result, wherein the preliminary result digits are selected, whose digit carry-in assumptions match the digit carry-ins;

selectively bitwise inverting, by the XOR gate, said intermediate result in case of a subtraction, wherein said selectively bitwise inversion depends on said end around carry; and selectively correcting, by the second adder and the third multiplexer, digits of said selectively inverted intermediate result to obtain the magnitude result of the mathematic operation, wherein said selectively correction in case of a subtraction depends on the value of the end around carry and the value of the digit carry-out of the particular digit, and in case of an addition depends on the value of the digit carry-out of the particular digit.

2. Method according to claim 1, wherein preparing the two decimal operands for a desired mathematic operation includes:

remaining a first one of the two operands unchanged;
changing a second one of the two operands by digitwise;
increasing the second operand by six for an addition;
bitwise inverting the second operand for a subtraction;
forwarding the unchanged operand independently of the desired mathematic operation; and
selecting the changed operand depending on the mathematic operation.

3. Method according to claim 1, wherein, in case of subtraction, said selectively bitwise inversion of the intermediate result occurs if the end around carry has a value of zero.

4. Method according to claim 1, wherein, in case of subtraction, said selectively correction of the selectively inverted intermediate result includes subtracting a constant modulus of six from each digit having digit carry-out of one, in case of an end around carry of zero, or from each digit having digit carry-out of zero, in case of an end around carry having a one.

5. Method according to claim 1, wherein, in case of addition, said selectively correction of the selectively inverted intermediate result includes subtracting a constant modulus of six from each digit having digit carry-out of zero.

6. Decimal arithmetic logic unit structure to generate a magnitude result of a mathematic operation of two decimal operands within one cycle, wherein the decimal operands are in hexadecimal sign magnitude format with each decimal digit of the operands represented by a code of four bits, said decimal arithmetic logic unit structure comprising:

means to prepare the two decimal operands for a desired mathematic operation;

means to generate preliminary result digits by digitwise adding the digits of the prepared operands under the assumption of digit carry-ins of zero;

means to generate preliminary result digits by digitwise adding the digits of the prepared operands, when the digit carry-ins is one, wherein said decimal arithmetic logic unit structure comprises:

means to determine digit carry-outs according to end around carry principles, which digit carry-outs are digit carry-ins for the next higher digits respectively, wherein an end around carry is generated that is the digit carry-out of the most significant digit which simultaneously is the carry-in of the least significant digit, means to digitwise select preliminary result digits to generate an intermediate result, wherein the preliminary result digits are selected, having carry-in assumptions match the digit carry-ins determined according to said end around carry principles, means to selectively bitwise invert said intermediate result in case of a subtraction, wherein said selectively bitwise inversion depends on said end around carry, and means to selectively correct digits of said selectively inverted intermediate result to obtain the magnitude result of the mathematic operation, wherein said selectively correction in case of a subtraction depends on the value of the end around carry and the value of the digit carry-out of the particular digit, and in case of an addition depends on the value of the digit carry-out of the particular digit.

7. Decimal arithmetic logic unit structure according to claim 6, wherein the means to prepare the two decimal operands for a desired mathematic operation comprise means to digitwise increase one of the two operands by six for an addition, means to bitwise invert one of the two decimal operands for a subtraction, means to select the prepared operands depending on the desired mathematic operation, and means to forward one of the two operands unchanged.

8. Decimal arithmetic logic unit structure according to claim 7, wherein the means to select the prepared operands depending on the desired mathematic operation comprise a multiplexer controlled by a signal indicating an effective decimal addition or an effective decimal subtraction, said multiplexer having two inputs, wherein a first input is connected with the means to digitwise increase one of the two operands by six for an addition and a second input is connected with the means to bitwise invert one of the two decimal operands for a subtraction.

9. Decimal arithmetic logic unit structure according to claim 6, wherein the means to generate preliminary result digits comprises digitwise adding the digits of the prepared operands under the assumption of digit carry-ins of zero and the means to generate preliminary result digits by digitwise adding the digits of the prepared operands under the assumption of digit carry-ins of one comprise pre sum logics having three inputs each, a first and a second one connected with the means to prepare the two operands respectively and a third one fed with a constant input signal of zero and one respectively, said input signals representing said carry-in assumptions.

10. Decimal arithmetic logic unit structure according to claim 6, wherein the means to determine digit carry-outs comprises a digit end around carry network arranged in parallel to the means to generate preliminary result digits by digitwise adding the digits of the prepared operands under the assumption of digit carry-ins of zero, and the means to generate preliminary result digits comprises digitwise adding the digits of the prepared operands under the assumption of digit carry-ins (DCyIni+1) of one.

11. Decimal arithmetic logic unit structure according to claim 10, wherein the means to digitwise select preliminary result digits to generate an intermediate result comprise a multiplexer with pairs of inputs digitwise fed by said preliminary result digits determined under the two assumptions of a digit carry-in of zero and one, wherein said multiplexer is controlled by the digit carry-outs determined by the end around carry network.

12. Decimal arithmetic logic unit structure according to claim 6, wherein the means to selectively bitwise invert said intermediate result in case of a subtraction comprises an XOR-stage which bitwise inverts said intermediate result in case of an end around carry of zero.

13. Decimal arithmetic logic unit structure according to claim 6, wherein the means to selectively correct digits of said selectively inverted intermediate result in case of a subtraction comprises means to subtract a constant modulus of six from each digit whose digit carry-out is one in case of an end around carry of zero or from each digit whose digit carry-out is zero in case of an end around carry of one.

14. Decimal arithmetic logic unit structure according to claim 6, wherein the means to selectively correct digits of said selectively inverted intermediate result in case of an addition comprises means to subtract a constant modulus of six from each digit whose digit carry-out is zero.

\* \* \* \* \*